Patented May 12, 1925.

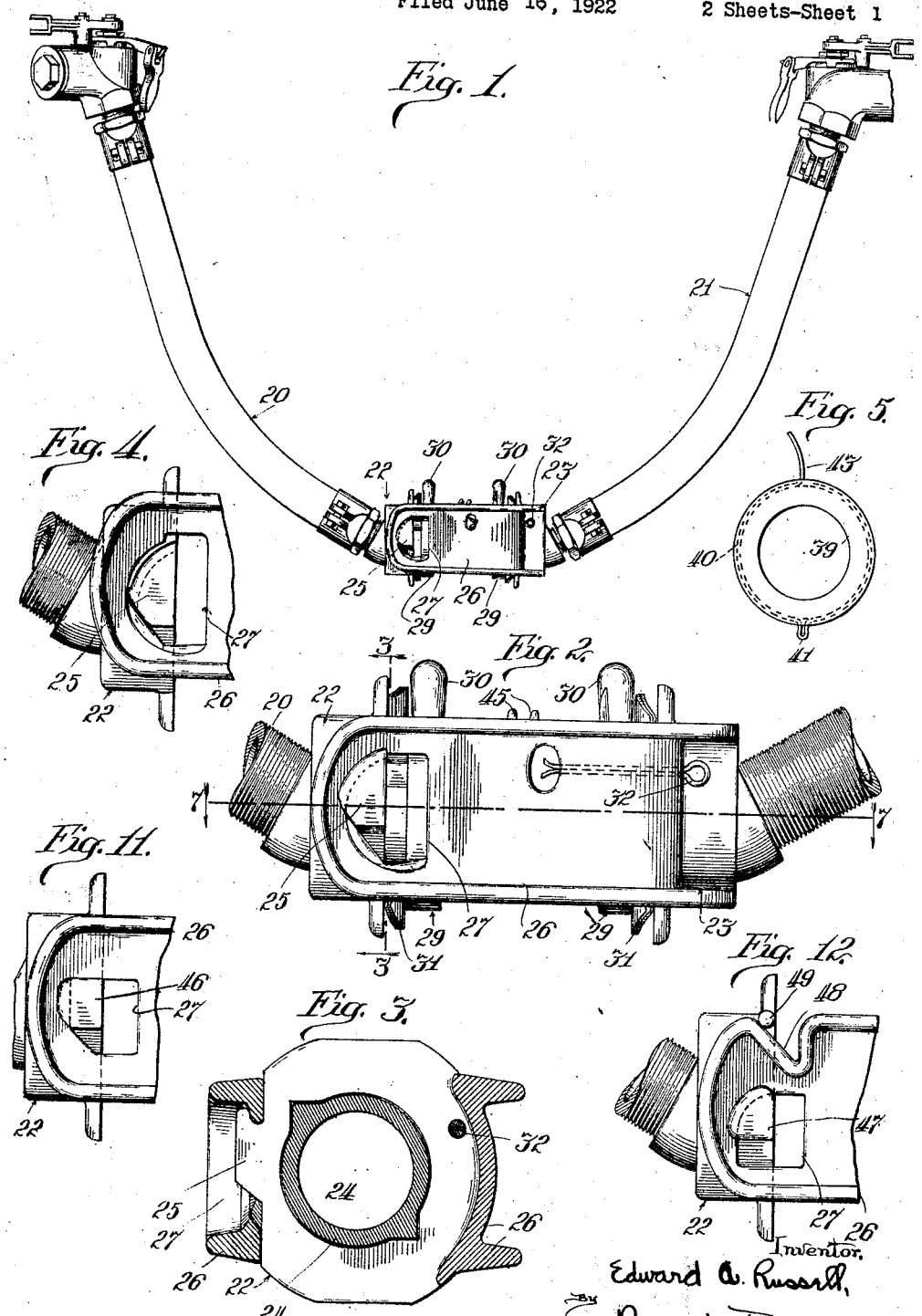

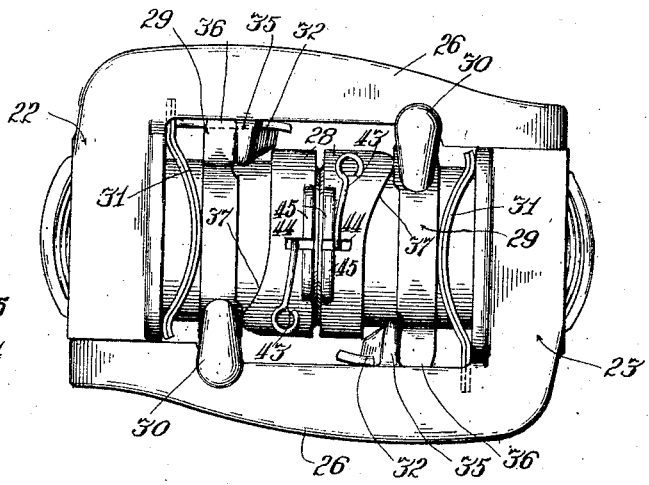
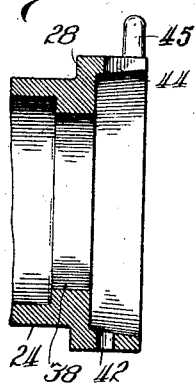
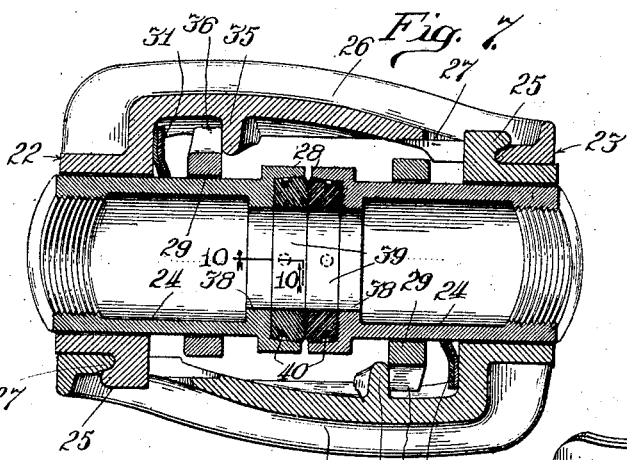
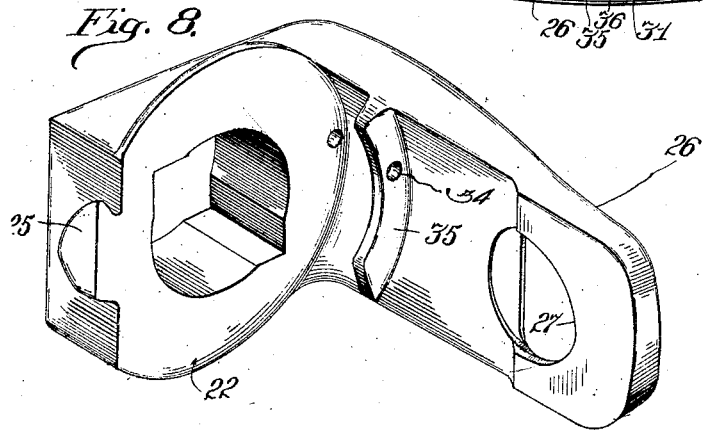
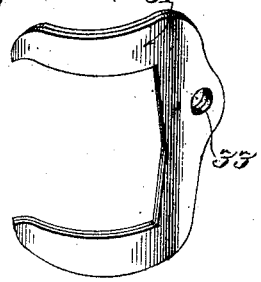

1,537,705

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

TRAIN-PIPE-HOSE COUPLING.

Application filed June 16, 1922. Serial No. 568,673.

*To all whom it may concern:*

Be it known that I, EDWARD A. RUSSELL, a citizen of the United States, residing at Chicago, in the county of Cook and State of Illinois, have invented certain new and useful Improvements in Train-Pipe-Hose Couplings, of which the following is a specification.

My invention relates to a hose coupling and especially to a coupling for detachably engaging the rubber hose, or equivalent flexible metal conduit elements, forming the connection between train pipes, steam or air, on adjacent cars of a railway train. The invention seeks to simplify the construction and otherwise improve upon this type of coupling, consisting of the two mating elements, each comprising a conduit member, ordinarily provided with a gasket, and a coupling member through which this conduit member is thrust by a wedging or cam action against the conduit member of the cooperating mating element, the coupling member being engageable with each other by a movement laterally one toward the other, without any rocking or angular movement.

My invention comprises generally a simplification of the coupling structures, minimizing the cost of manufacture, machining, and assembling the parts, together with an improved construction of the inter-engaging parts whereby the engagement and disengagement of the coupling members are facilitated.

Other incidental improvements will appear from the description.

That which I believe to be new is set forth in the claims.

In the drawings—

Fig. 1 is a side view, showing my improved hose coupling in use.

Fig. 2 is an enlarged view of the inter-engaged mating elements.

Fig. 3 is a vertical cross-section taken on line 3—3 of Fig. 2.

Fig. 4 is a fragmentary view, showing the changed position of the parts at the left in Fig. 2 when upward pressure is applied for disengaging the mating elements.

Fig. 5 is a view of my improved gasket.

Fig. 6 is a top view of the part shown in Fig. 2.

Fig. 7 is a horizontal section taken on line 7—7 of Fig. 2.

Fig. 8 is a perspective view of one of the coupling members with the conduit member, cam and spring removed.

Fig. 9 is a face view of one of the spring members.

Fig. 10 is a fragmentary view, being a cross-section taken on line 10—10 of Fig. 7, but with the gasket removed; and Figs. 11 and 12 are fragmentary views, showing changed forms of construction of the parts illustrated in Fig. 4.

Referring to the several figures of the drawings, in which corresponding parts are indicated by the same reference characters,— 20 and 21 indicate the rubber hose structures at the ends of two adjacent cars of a railway train, being provided with mating coupling elements 22 and 23, respectively. Inasmuch as the members 22 and 23 are exactly similar and are similarly equipped, it is believed that a description of one of such members will suffice, similar numerals being placed upon the corresponding parts of the two members.

As is best shown in Fig. 8, each of the mating coupling members 22, 23 is hollow, so as to receive a conduit member 24, the conduit member and the opening through the coupling member being angular in whole or in part, so as to prevent rotation of one with respect to the other, while at the same time permitting free movement of the conduit member longitudinally with respect to the coupling member. At one side face of the coupling member, I have provided a lug 25 of the character hereinafter described, and at the opposite side I have provided a forwardly extending arm 26 having an opening 27 in its outer end.

As is clearly shown in Figs. 6 and 7, the conduit member 24 is provided on its forward end with an enlarged head 28, adjacent to which there is slidably mounted a rotary cam member 29, which is adapted to be given a rotary movement by means of an arm 30. Between the cam member 29 and the body portion of the coupling member 22, there is mounted a spring member 31, which in the construction shown is in the form of a pair of plates, each in the form of a yoke, the arms of the yokes being curved so as to hold the cam member 29 yieldingly in spaced relation to the body of the coupling member. The spring plates 31 are held in position by means of a pin 32 passing through an opening 33 in the springs, as shown in Fig. 9, the outer end of the pin extending through an opening 34 in a vertically disposed rib 35 carried by the arm 26 on its inner face, as is best shown in Fig. 8. As is best shown in Fig. 7, the cam ring 29 is provided with an outwardly extending lug 36 which is adapted by engagement with the pin 32 to limit the rotary movement of the cam member. As is best shown in Fig. 6, the heads 28 formed on the forward ends of the conduit members 24 are provided with cam faces 37, which are adapted by cooperation with suitable cams on the front faces of the cam members 29 to force the conduit members forwardly when the cam members 29 are given a movement in the operative direction for effecting such results. Inasmuch as this construction is well known in the art, it is not believed to be necessary to further describe the structure or operation herein.

As is clearly shown in Fig. 7, the forward end of the conduit member 24 is provided with an annular rib or collar 38 on its inner face near its forward end, such rib or collar forming a shoulder against which a gasket 39 is adapted to bear. This gasket 39 is of any approved type, being preferably formed of fiber or metal. As is shown in Fig. 7, the gasket 39 is provided on its outer face with a circumferential groove in which there is located a gasket-retaining member 40 in the form of a split ring formed of wire. As is best shown in Fig. 5, the wire of the retainer 40 is doubled upon itself at one side to provide the projection 41 which is adapted to be inserted through an opening 42 in the outer end of the conduit member 24 in front of the shoulder 38. As is also clearly shown in Fig. 5, one of the ends of the wire forming the retaining member 40 is bent outwardly for providing a flexible arm 43, which is adapted to enter a slot 44 in the end of the conduit 24 opposite the opening 42, the outer end of the slot 44 being open to permit the entrance of the flexible arm 43. When the gasket 39 has been placed in position, with the arm 43 extending upwardly through the slot 44, such arm is adapted to be bent down in rear of one of the lugs 45 formed on the outer face of the conduit member at either side of the open ended slot 44. The retaining member 44 is thus enabled to hold the gasket 39 removably in position so as to be easily and quickly removed and as easily and quickly replaced when desired.

As is well understood in the art, in use the lugs 25 of two mating coupling members are adapted to engage the openings 27 of the arms 26 of said members brought together by a lateral movement into preliminary engagement in the usual manner. After this preliminary engagement, the devices settle by gravity into substantially their normal engaging position as illustrated in Fig. 2, being forced to, and held in, engaging position by the cam surfaces hereinafter described. When the arms 26 have been connected with the lugs 25 in this manner, the cam members 29 are adapted to be given operative rotary movement through the medium of the handles 30, for forcing the gaskets 39 into operative contact with each other for completing the connection between the two conduit members 24. As will be readily understood, the operation of tightening the conduit members 24 against each other serves to force the coupling member 23 towards the right in Fig. 7, and the coupling member 22 towards the left, serving thus to bring the arms 26 and the lugs 25 into their normal effective engagement and serving to hold them in such engagement.

As is clearly shown in Fig. 2, the lugs 25 are undercut on their upper and their rear faces, in the construction shown the upper and rear faces of the lugs being merged into one curved surface, with the engaging portion of the opening 27 of a corresponding shape. As is also shown in Fig. 2, the lower rear portion of the opening 27 is diagonally disposed, the arrangement being such that, with the mating coupling members hanging in the position shown in Fig. 2, and with the cam members 29 in their loosened position, upon upward movement of each arm 26 with relation to the cooperating lug 25, such arm will be moved longitudinally with respect to the lug into the position illustrated in Fig. 4, in which the opening 27 is in such position that by a lateral movement the arm 26 can be freed from the lug 25. As is best shown in Fig. 3, the lower face of the lug 25 is also beveled laterally, and the lower face of the opening 27 adjacent thereto is given a corresponding shape. As a result, after the arm is moved upward some little distance as above suggested, continued upward movement of the arm causes such arm to ride outwardly with respect to the body of the mating member for clearing the arm entirely from the lug 25.

It will be noted that since each coupling member is supported at its outer end by one of the hose connections 20 or 21, the tendency is for the outer end of the arm 26 to be thrown downwardly by gravity. This is in opposition to the upward movement of this arm necessary to disconnect the coupling, and this explains why the device, when the lugs have been preliminarily engaged will automatically settle to lock in position by the action of gravity, ultimately exerted on the cam surfaces hereinabove described. In this position the device cannot be accidentally disconnected. However, by the simultaneous manipulation of the two coupling members so as to lift the outer ends of each of the arms 26, the parts will be automatically cammed to first disengage the undercut locking flanges on the lugs, and subsequently separate the members laterally to remove the lugs from the recesses 27 in arms 26.

In Fig. 11, I have illustrated the modified form of construction in which the lug 46 formed on the side of the coupling member 22 is undercut on its rear face only, the lower rear face of the opening 27 in the arm 26 being diagonally disposed so as to secure the longitudinal movement of the arm 26 with respect to the coupling member 22 when such arm is moved upwardly thereon.

In Fig. 12, I have shown still another modified construction in which a lug 47, similar to the lug 25, is provided, being undercut on its rear and its upper faces. In the construction here shown, the cam faces for procuring the longitudinal movement of the arm 26 with respect to the coupling member 22 when the arm is moved upwardly with respect to the couplings, are located upon members independent of the lug 47 and the opening 27 in the arm 26. In the construction here shown, the arm 26 is provided with a diagonally disposed cam face 48 on its upper face near the end, such cam 48 being adapted to cooperate with a lug 49 formed on the coupling member 22 for giving the desired relative movement.

So far as I am aware, I am the first in the art to provide a construction by the use of which the engaging arm of a pair of mating coupling members of this type is given a movement for disengaging it from the lug of the other member when such arm is moved upwardly with respect to such other mating member, and my claims are to be construed accordingly.

While I prefer to embody my invention in the form illustrated in the drawings, it will be understood that I do not wish to be restricted to the details of such construction except as such details are covered by the claims, since it is evident that many changes might be made in the construction without departing from my invention.

I claim:

1. A hose coupling comprising a coupling member, a lug on one side face thereof, and an arm on the opposite side extending forwardly therefrom, the arms and lugs of mating coupling members being adapted by interengagement to connect said members together, and means to give the two members relative longitudinal movement to disengage them upon the upward movement of the arm of each member from normal engaging position with the lug of the other member.

2. A hose coupling comprising a coupling member, a lug on one side face of the coupling member undercut on its rear face, and an arm on the opposite side of the coupling member extending forwardly therefrom, the arms and lugs of mating coupling members being adapted by relative movement longitudinally of the coupling members after preliminary engagement to assume normal operative engagement, and means to give the two members relative longitudinal movement to disengage them upon the upward movement of the arm of each member from normal engaging position with the lug of the other member.

3. A hose coupling comprising a coupling member, a lug on one side face of the coupling member undercut on its rear face, and an arm on the opposite side of the coupling member extending forwardly therefrom, the arms and lugs of mating coupling members being adapted by relative movement longitudinally of the coupling members after preliminary engagement to assume normal operative engagement, the interengaging surfaces of the two members comprising cam faces adapted upon upward movement of the arm of each member from normal engaging position with the lug of the other member to give the two members a preliminary relative longitudinal movement for disengaging said members.

4. A hose coupling comprising a coupling member, a lug on one side face of the coupling member undercut on its rear face, and an arm on the opposite side of the coupling member extending forwardly therefrom, the arms and lugs of mating coupling members being adapted by relative movement longitudinally of the coupling members after preliminary engagement to assume normal operative engagement, the interengaging surfaces of the lugs and arms comprising cam faces adapted upon upward movement of the arm of each member from normal engaging position with the lug of the other member to give the two members a preliminary relative longitudinal movement for disengaging the members.

5. A hose coupling comprising a coupling member, a lug on one side face of the coupling member, and an arm on the opposite side of the coupling member extending forwardly therefrom, the arms and lugs of mating coupling members being adapted by relative movement longitudinally of the coupling members after preliminary engagement to assume normal effective engagement, the lower portion of the face of each of the arms which is adapted to engage the lug of the other member being diagonally disposed, whereby upon upward movement of the arm of each member from normal engaging position with the lug of the other member, the two members are given a relative longitudinal movement in the direction for disengagement of said members.

6. A hose coupling comprising a coupling member, a lug on one side face of the coupling member, and an arm on the opposite side of the coupling member extending forwardly therefrom, said arm being provided with an opening adapted to have preliminary engagement with the lug of the mating coupling member, and adapted by longitudinal movement with relation to said mating member to have normal effective engagement with said lug, the lower portion of the rear face of said opening being diagonally disposed whereby upon upward movement of the arm from normal engaging position with the lug of the other member, the two members are given a relative longitudinal movement in the direction for disengagement of said members.

7. A hose coupling comprising a coupling member, a lug on one side face of the coupling member and undercut on both its upper and its rear faces, and an arm on the opposite side of the coupling member extending forwardly therefrom, the arms and lugs of mating coupling members being adapted by relative movement longitudinally of the coupling members after preliminary engagement to assume normal effective engagement, and means to give the two members relative longitudinal movement to disengage them upon the upward movement of the arm of each member from normal engaging position with the lug of the other member.

8. A hose coupling comprising a coupling member, a lug on one side face of the coupling member and undercut on both its upper and rear faces, and an arm on the opposite side of the coupling member extending forwardly therefrom, said arm being provided with an opening adapted to have preliminary engagement with the lug of a mating coupling member and adapted by movement downwardly and longitudinally with respect to said mating coupling member to have normal effective engagement with said lug, the lower portion of the rear face of said opening being diagonally disposed whereby upon upward movement of the arm from normal engaging position with the lug of the other member, the two members are given a relative longitudinal movement in the direction for disengagement of said members.

9. A hose coupling comprising a coupling member, a lug on one side face thereof, an arm on the opposite side extending forwardly therefrom, the arms and lugs of mating coupling members being adapted by interengagement to give said members a preliminary engagement and adapted by subsequent relative longitudinal movement of said members in one direction to give the members an effective engagement, and means to give the two members relative longitudinal movement to disengage them upon the upward movement of the arm of each member from normal engaging position with the lug of the other member.

10. A hose coupling comprising a coupling member, an arm extending forwardly from the body of said member at one side thereof, means for releasably connecting the arms and bodies of two mating coupling members, and means to give the two members first a relative longitudinal movement and then a relative lateral movement to disengage them upon the upward movement of the arm of each member from normal engaging position with respect to the other member.

11. A hose coupling comprising a coupling member, an arm extending forwardly from the body of said member at one side thereof, means for releasably connecting the arms and bodies of the two mating coupling members, and means to give the two members relative longitudinal movement to disengage them upon the upward movement of the arm of each member from normal engaging position with respect to the other member.

12. A hose coupling comprising a coupling member, a lug on one side face thereof, and an arm on the opposite side extending forwardly therefrom, the arms and lugs of mating coupling members being adapted by interengagement to connect said members together, and means to give the two members first relative longitudinal movement and then relative lateral movement to disengage them upon the upward movement of the arm of each member from normal engaging position with the lug of the other member.

13. A hose coupling comprising a coupling member, a lug on one side face thereof, and an arm on the opposite side extending forwardly therefrom, the arms and lugs of mating coupling members being adapted by inter-engagement to connect said members together, and means adapted when the arms are moved upwardly to give the two members relative longitudinal movement and to force the arms laterally from the lugs to disengage them therefrom.

14. A hose coupling comprising a coupling member, a lug on one side face of the coupling member under-cut on its rear face, and an arm on the opposite side of the coupling member extending forwardly therefrom, the arms and lugs of mating coupling members being adapted by relative movement longitudinally of the coupling members after preliminary engagement to assume normal operative engagement, the inter-engaging surfaces of the two members comprising cam faces adapted upon upward movement of the arm of each member from normal engaging position with the lugs of the other member to give the two members a preliminary relative longitudinal movement and subsequently a relative lateral movement for disengaging said members.

15. A hose coupling comprising two similar cooperating members, there being a lug on each member adapted to interlock with an opening in an arm extending forwardly from the other member, and cooperating cam surfaces on the lugs and the walls of the openings, which automatically unlock the lugs and separate the lugs from the arms by imparting relative movements first longitudinally and then laterally to these parts when the ends of the arms are moved upwardly.

EDWARD A. RUSSELL.